United States Patent
Takeya et al.

(10) Patent No.: US 7,619,326 B2
(45) Date of Patent: Nov. 17, 2009

(54) ARTIFICIAL SATELLITE EQUIPMENT PANEL

(75) Inventors: Hajime Takeya, Tokyo (JP); Tsuyoshi Ozaki, Tokyo (JP); Hirotsugu Morinaga, Tokyo (JP); Shinji Badono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 611 days.

(21) Appl. No.: 11/534,684

(22) Filed: Sep. 25, 2006

(65) Prior Publication Data

US 2007/0221786 A1   Sep. 27, 2007

(30) Foreign Application Priority Data

Mar. 22, 2006 (JP) ............... 2006-079600

(51) Int. Cl.
*H02B 1/015* (2006.01)
(52) U.S. Cl. .................. 307/147; 244/158.1
(58) Field of Classification Search ........... 307/147; 244/158.1, 172.7, 123.12, 123.13
See application file for complete search history.

(56) References Cited

U.S. PATENT DOCUMENTS

| | | | | |
|---|---|---|---|---|
| 4,009,851 | A * | 3/1977 | Cable ........................ | 244/173.1 |
| 5,848,767 | A * | 12/1998 | Cappa et al. ............. | 244/158.1 |
| 5,897,080 | A * | 4/1999 | Barrett ...................... | 244/171.7 |
| 5,931,418 | A | 8/1999 | Eller et al. | |
| 5,979,833 | A | 11/1999 | Eller et al. | |
| 6,061,243 | A | 5/2000 | Barnett et al. | |
| 6,196,501 | B1 * | 3/2001 | Hall et al. ................. | 244/171.7 |
| 6,568,638 | B1 | 5/2003 | Capots | |
| 7,156,349 | B2 * | 1/2007 | Nakasuka ................. | 244/172.7 |
| 2006/0016935 | A1 | 1/2006 | Jordan et al. | |

FOREIGN PATENT DOCUMENTS

| | | |
|---|---|---|
| JP | 10-203494 | 8/1998 |
| JP | 10-215093 A | 8/1998 |
| JP | 2000-280999 | 10/2000 |

* cited by examiner

*Primary Examiner*—Albert W Paladini
(74) *Attorney, Agent, or Firm*—Leydig, Voit & Mayer, Ltd.

(57) ABSTRACT

A satellite equipment panel on which may be mounted an installation equipment of a predetermined function, connectable by an interface, constitutes an artificial satellite. The satellite equipment panel includes a panel body, at least two interfaces for an interconnection to another satellite equipment panel, a line transfer switch disposed within the panel body for line transferring of the interconnection between the interfaces, wiring disposed within the panel body and connected at one end to one of the interfaces and at the other end to the line transfer switch for interconnecting the interfaces on that panel body. The interfaces and the wiring, in cooperation with a support structure, constitute a wiring module disposed within the panel body. The interface may comprise at least one of interfaces of electric communication, optical communication, and optical sensor.

5 Claims, 3 Drawing Sheets

ARTIFICIAL SATELLITE EQUIPMENT PANEL

BACKGROUND OF THE INVENTION

This invention relates to an artificial satellite equipment panel for installation on an artificial satellite.

For assembly and test of an artificial satellite, the test must be achieved in terms of the satellite equipment as individual unit to be installed as well as in terms of the satellite system in which individual units are incorporated. The system test of the satellite here is required to be achieved after the system is manufactured and assembled into an assembly of the shape as close as the final shape at which the satellite actuary operates on the orbit. The reason for this is because, in the satellite system, the arrangement and the wiring routes for the respective components on the satellite structure are designed solely for that particular satellite, and the examination of the functions of the satellite system must be achieved in terms of the components to be tested, with all the components mounted on the equipment panels, by connecting them and supplying electric power. For the test of the functions of the system, it is not sufficient to test individual components separately.

Therefore, when any malfunction or trouble is found in the satellite system during the test, the malfunctioned equipment must be dismounted, repaired and mounted again. However, dismounting and mounting of the malfunctioned equipment takes a very long time because the equipments are assembled in the satellite final shape.

In order to alleviate this problem, Japanese Patent Laid-Open No. 10-203494 proposes that the module-type spacecraft structure be composed of a standard bus unit and modules to which independent functions are assigned, and the arrangement is such that a satellite can be constructed by connecting the modules to the standard bus unit.

Also, the interface checker disclosed in Japanese Patent Laid-Open No. 2000-280999 is composed of a signal interface connector for receiving output signals from artificial satellite installation equipments as shown in FIG. 7, change-over switches, measurement unit and a data processing unit and capable of an automatic checking of the equipments themselves and between the harnesses. Therefore, the signal lead-out and confirmation operation for checking the signal between the installed equipments, which have heretofore been complicated, been hard and can be simplified, improving the productivity and maintenance.

In the module-type spacecraft structure disclosed in Japanese Patent Laid-Open No. 10-203494, it is only necessary to connect the modules to the standardized bus unit, whereby new functions may be added to the satellite and the satellite can be made light-weighted and compact. However, the test cannot be conducted without the standardized bus unit, so that the bus unit is indispensable even in the test wherein the modules on which equipments are mounted are combined and the test cannot be conducted with the equipment panels alone. Also, the modules must be connected through the use of the standardized bus unit, so that the structure cannot be applied to the box-shape satellite, posing a limitation to the configuration of the satellite.

Also, the interface checker disclosed in Japanese Patent Laid-Open No. 2000-280999 allows an automatic check of the equipments themselves and between the harnesses connecting the equipments, so that the signal lead-out and confirmation operations for the signal check between the mounted equipments, which has heretofore been complex, can be simplified and thus the productivity and maintainability can be improved. However, although this checker achieves the automatic check of the equipment themselves and the connections between the harnesses, the checker cannot be used for testing a satellite system in which these equipments are combined.

Accordingly, the present invention was made to solve the above-discussed problems and has as its object the provision of a satellite equipment panel that allows various system tests or satellite equipment tests by combining prescribed numbers of equipment panels necessary for constituting the satellite, and that does not need the wiring operation when the satellite equipments are mounted to and dismounted from the equipment panel and when the equipment panels are connected together, whereby the artificial satellite delivery time is shortened, test cost is reduced and the reliability is improved.

SUMMARY OF THE INVENTION

With the above object in view, the present invention resides in a satellite equipment panel which mounts an installation equipment of a predetermined function and connectable by an interface to constitutes an artificial satellite. The satellite equipment panel comprises a panel body, at least two interfaces for an interconnection to another satellite equipment panel, a line transfer switch disposed within the panel body for line transferring of the interconnection between the interfaces, a wiring disposed within the panel body and connected at one end to the interface and at the other end to the line transfer switch for interconnecting the interfaces on that panel body.

The satellite equipment panel may be arranged such that the interface and the wiring, in cooperation with a support structure for supporting the interface and the wiring, constitutes a wiring module disposed within the panel body, and that the support structure of the wiring module extends along the wiring to support the wiring and supports at one end the interface and at the other end a connector assembly connected to the line transfer switch.

The wiring module may comprise an installation equipment connection interface connected to the wiring between both ends thereof for connection to the installation equipment.

The interface may comprise at least one of interfaces of electric communication, optical communication and optical sensor.

The wiring module may be disposed within the panel body having a honey-comb core structure.

The satellite equipment panel of the present invention comprises at least two standardized interfaces for an interconnection to another satellite equipment panel, the interfaces being interconnected via a wiring module and being provided with a line transfer switching function for line transferring of the interconnection between the interfaces, so that the equipment panels may be freely connected and the communication line may be freely established, thereby realizing the shortened artificial satellite delivery time, the reduced test cost and the improved reliability.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
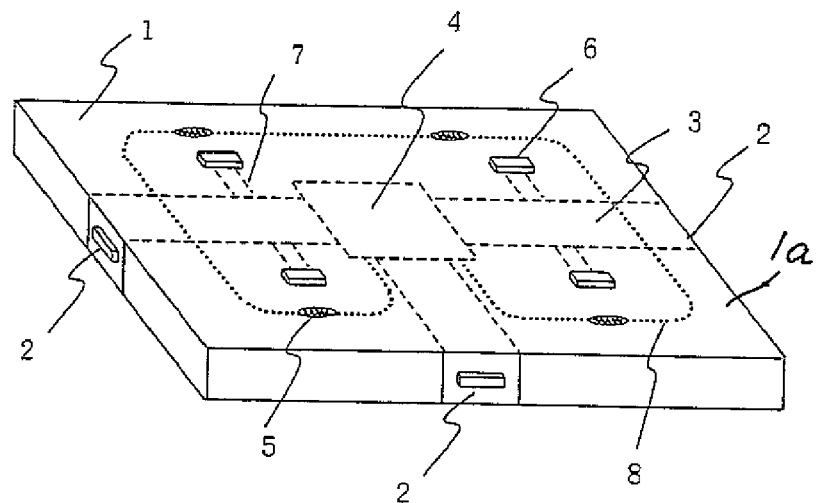
FIG. 1 is a perspective view showing an artificial satellite equipment panel of the present invention.
Figure 2:
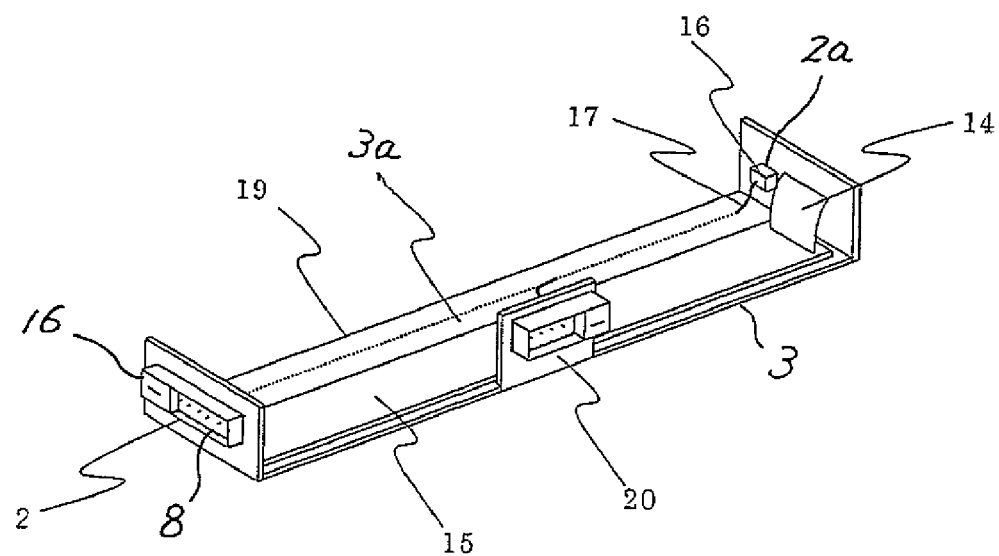
FIG. 2 is a perspective view showing the wiring module shown in FIG. 1.

FIG. 1 is a perspective view showing an artificial satellite equipment panel 1 of the present invention, and FIG. 2 is a perspective view showing a wiring module 3 of the artificial satellite equipment panel 1 shown in FIG. 1. The artificial satellite equipment panel 1 comprises a generally rectangular or square and relatively thin box-shaped panel body 1a including a base and a cover. The panel body 1a has disposed thereon a plurality of interfaces 2 for the functional connection to various other equipments including other similar artificial satellite equipment panel 1. Although not illustrated, the panel body 1a is also provided with a mechanical connection mechanism for the support by other equipments.

The panel body 1a has also disposed thereon a line transfer switch 4 for line transferring of the interconnection between the interfaces 2. The line transfer switch 4 is a generally rectangular or square box-shaped component disposed and supported within the panel body 1a and includes a connector (not shown) which will be described later at each of at least two sides (three sides in the illustrated example).

The artificial satellite equipment panel 1 also comprises a wiring 3a having one end connected to the interface 2 and the other end connected via a connector (not shown) to the line transfer switch 4. The wiring 3a disposed within the panel body 1a connects the interfaces 2 of that panel body 1a via the line transfer switch 4.

As shown in FIG. 2, the interfaces 2 and the wiring 3a, together with the support structure 19, constitute a wiring module 3 which is an assembly disposed within the panel body 1a. The support structure 19 extends along the wiring 3a to support it and has one end that supports the interface 2 and the other end that supports a connector assembly 2a for the connection to the line transfer switch 4. The wiring for the electrical communication out of the wiring 3a is achieved by a wiring board 15, and the wiring board 15 is connected to a connector 8 of the interface 2 via a tape-shaped conductor wire 14. The optical wiring for the optical communication and optical sensor includes an optical fiber 17 and an optical connector 16 of the interface 2. The optical fiber 17 is embedded within the support structure 19 of the wiring module 3a. The interface 2 may be at least one interface of the electrical communication, the optical communication and the optical sensor. With this structure, the electrical communication, the optical communication and the optical sensor can be established between the equipment panels, so that a free communication route may be provided, thereby realizing the shortened artificial satellite delivery time, the reduced test cost and the improved reliability.

Supported by the support structure 19 and connected to the wiring 3a of the wiring module 3 between both ends of the wiring 3a is an installation equipment connection interface 20 for connection to the installation equipments 21-24. The connection to the installation equipment connection connector 6 (FIG. 1) is established by this connection interface 20. Three wiring modules 3 as shown in FIG. 3 are provided in the artificial satellite equipment panel 1 shown in FIG. 1, so that the interface 2 on one end is positioned at the side wall of the panel body 1a the connector assembly 2a on the other end is connected is connected to the connector (not shown) of the line transfer switch 4.

In other words, the illustrated artificial satellite equipment panel 1 is provided with three interfaces 2 (one for each of three sides of the rectangular panel body 1a), and the interfaces 2 and the line transfer switch 4 are connected to each other by the wiring module 3. An optical fiber sensor 5 is disposed on the major surface of the panel body 1a and is connected to the line transfer switch 4 by the optical fiber 8. Here, the optical fiber sensor 5 uses a fiber Bragg grating which allows the measurement of the temperature or the strain of the artificial satellite equipment panel 1 on the basis of the changes in the Bragg wavelength.

Figure 3:
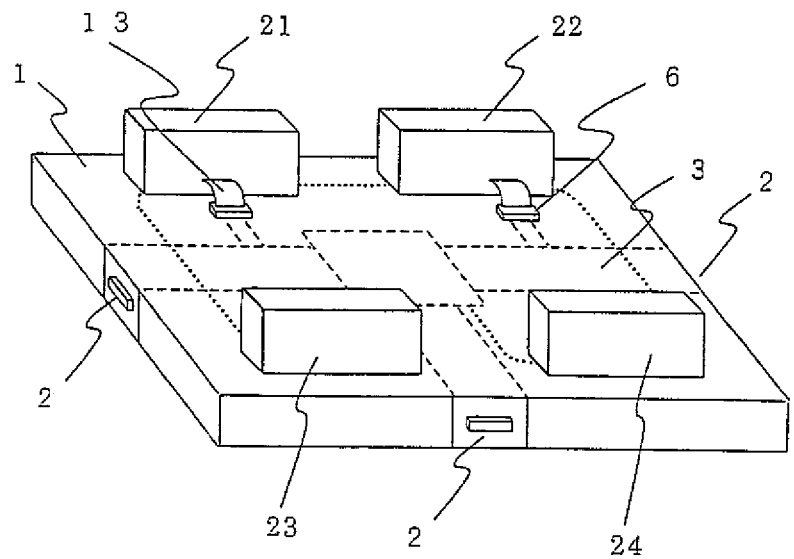
FIG. 3 is a perspective view showing the state in which the installation equipments are mounted to the artificial satellite equipment panel shown in FIG. 1.

FIG. 3 is a perspective view showing the state in which the installation equipments 21-24 are mounted to the artificial satellite equipment panel 1 of the present invention. Thus, the installation equipments 21-24 are connected to the artificial satellite equipment panel 1 by the installation equipment connecting connectors 6 connecting the wires 13 and are further connected to the fine transfer switch 4 via the installation equipment connection connectors 6. Since the optical fiber sensor 5 is disposed directly bellow the installation equipments 21-24, the heat (temperature) or the strain generated at the installation equipments 21-24 can be measured.

Figure 4:
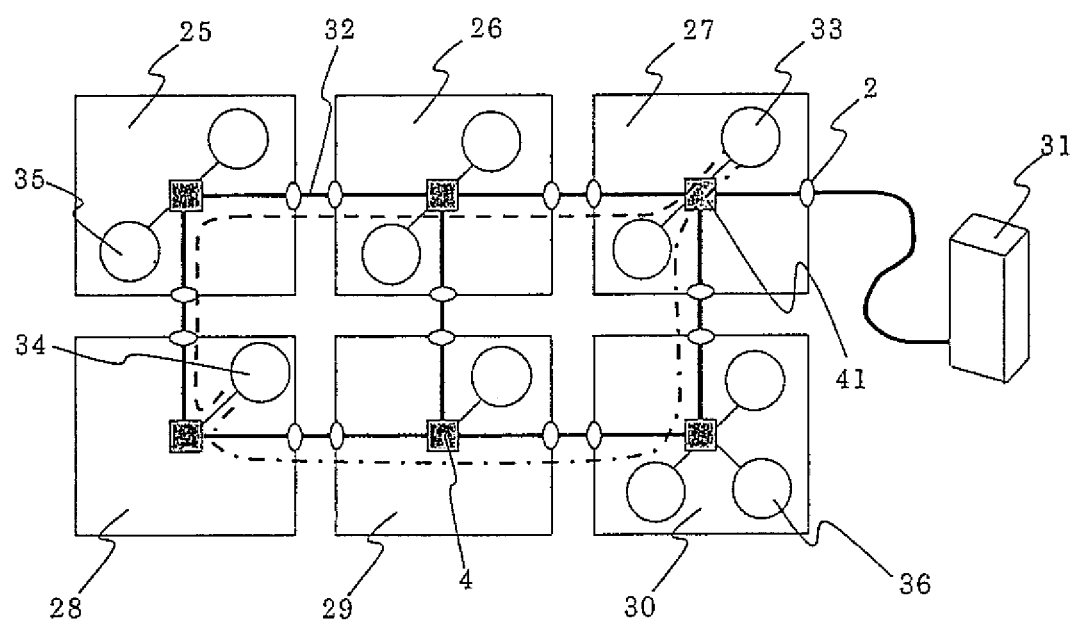
FIG. 4 is a schematic view showing how the test of the installation equipments and the satellite system is achieved with the artificial satellite equipment panel of the present invention.

FIG. 4 is a schematic view showing how the test of the installation equipments using the artificial satellite equipment panel 1 of the present invention is achieved. In this example, six artificial satellite equipment panels 25-30 each having two or three interfaces 2 and a measurement and control unit 31, which are in the developed state before assembled into a box-shape, are connected to each other via connection cables 32 connected to the interfaces 2.

With the structure as above described, it is possible that the measurement and control unit 31 causes, by remote control, an electrical communication to be carried out between the installation equipments 33 and 34, for example, to inspect the contents. It is to be noted that the line transfer switch 41 may have its communication route selected from two ways of the artificial satellite equipment panel 30 or the artificial satellite equipment panel 26. Therefore, it is possible to select a plurality of routes such as two routes shown by the dash line or a dot-and-dash line in FIG. 4. Further, it is possible to monitor the optical communication between the installation equipment 35 and the installation equipment 36, for example. Furthermore, the temperature of the installation equipment in operation can be measured by the optical sensor 5. The line transfer switch 41 may switch the optical lines for the optical communication or optical sensor, enabling to select a plurality of communication routes in a manner similar to the electrical communication.

As has been described, the artificial satellite equipment panel 1 may be freely combined and the communication routes may be feely set by the line transfer switch 4 for various tests, and since the equipment panel includes the wiring function and the I/F functions, only the artificial satellite equipment panels needed to be tested may be combined, permitting the testing to be freely set. Therefore, the shortened artificial satellite delivery time, the reduced test costs and the improved reliability can be realized.

Figure 5:
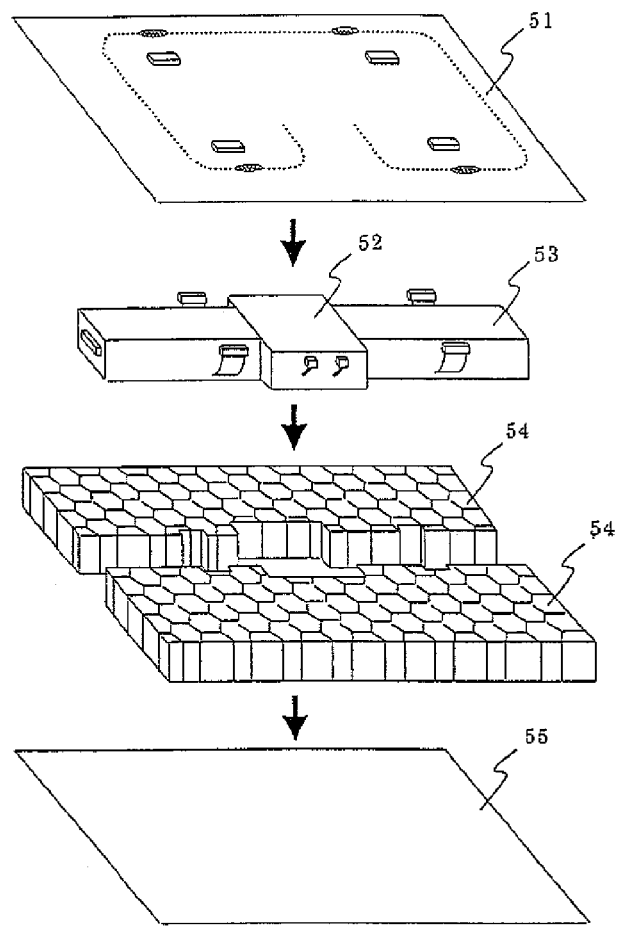
FIG. 5 is a perspective view showing another artificial satellite equipment panel of the present invention.
Figure 6:
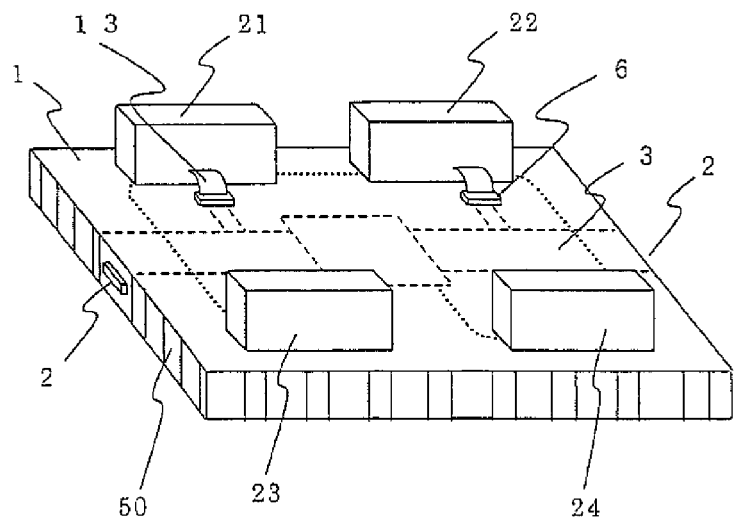
FIG. 6 is a perspective view showing how the installation equipments are mounted to the artificial satellite equipment panel shown in FIG. 5.

FIG. 5 is a perspective view showing another example of the artificial satellite equipment panel 1 of the present invention, and FIG. 6 is a perspective view showing how the installation equipments 21-24 are mounted to the artificial satellite equipment panel 1 shown in FIG. 5. In this example, the panel body 50 of the artificial satellite equipment panel 1 has a honey-comb sandwich structure in which an upper sheet 51, a honey-comb core 54 and a lower sheet 55 are bonded together.

Here, the arrangement is such that a portion of the honey-comb core in the region in which the wiring module 53 and the line transfer switch 52 are installed is removed, the wiring module 53 and the line transfer switch 52 are embedded within the panel, and sandwiched by the upper sheet 51 and the lower sheet 55. According to this structure, the communication equipments or components such as the wiring and the transfer switch is not required to be mounted on the panel outer surface, the region for mounting the installation equipments can be made wider, thereby realizing the small-sized, low cost artificial satellite.

What is claimed is:

1. A satellite equipment panel on which is mounted an installation equipment having a predetermined function and connectable by an interface to constitute an artificial satellite, comprising:
    a panel body;
    at least two interfaces for interconnection to another satellite equipment panel;
    a line transfer switch disposed within said panel body for transferring of an interconnection between said interfaces; and
    wiring disposed within said panel body and connected at a first end to one of said interfaces and at a second end to said line transfer switch for interconnecting said interfaces on that panel body.

2. The satellite equipment panel as claimed in claim 1, including a support structure for supporting one of said interfaces and said wiring, wherein
    said interfaces and said wiring, in cooperation with said support structure for supporting said interfaces and said wiring, constitute a wiring module disposed within said panel body, and
    said support structure of said wiring module extends along said wiring to support said wiring and supports at a first end of one of said interfaces and at a second end a connector assembly connected to said line transfer switch.

3. The satellite equipment panel as claimed in claim 2, wherein said wiring module comprises an installation equipment connection interface connected to said wiring between the first and second ends of said wiring for connection to the installation equipment.

4. The satellite equipment panel as claimed in claim 1, wherein said interfaces comprise at least one of interfaces of electric communication, optical communication, and optical sensing.

5. The satellite equipment panel as claimed in claim 2, wherein said wiring module is disposed within said panel body and said panel body has a honey-comb core structure.

* * * * *